Figure 1:
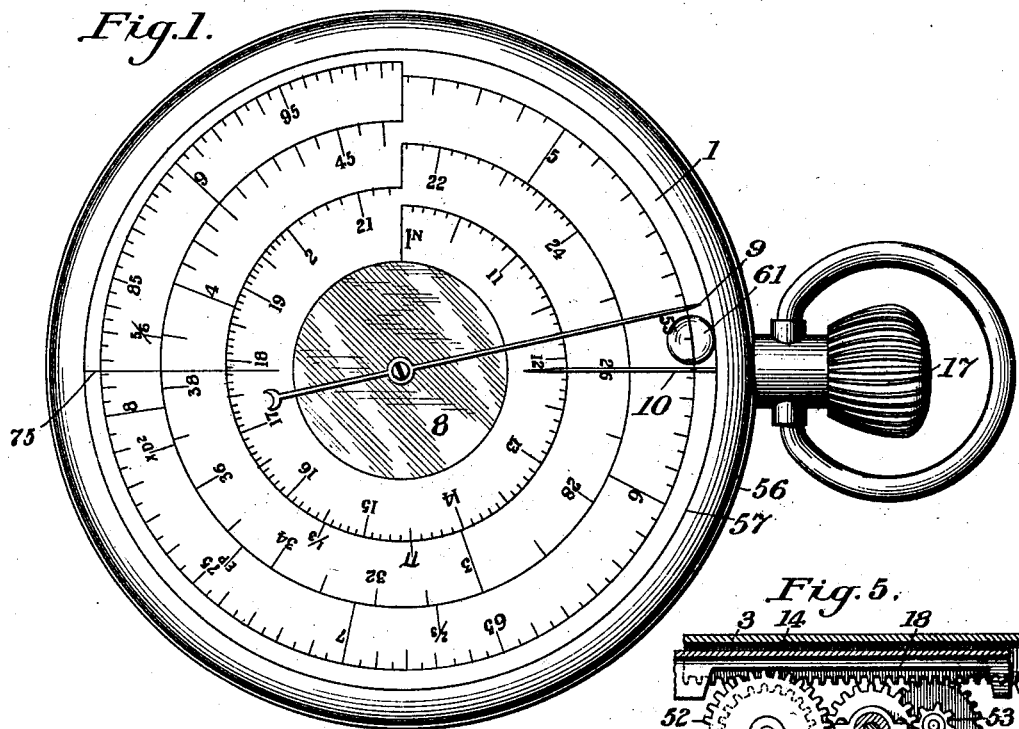

No. 773,235. PATENTED OCT. 25, 1904.
E. A. SPERRY.
LOGARITHMIC CALCULATOR.
APPLICATION FILED DEC. 21, 1903.
NO MODEL. 2 SHEETS—SHEET 1.

Witnesses:
R. F. Balderson
J. B. Hill

Inventor:
Elmer A. Sperry,
by Byrnes & Townsend
Attorneys

No. 773,235. PATENTED OCT. 25, 1904.
E. A. SPERRY.
LOGARITHMIC CALCULATOR.
APPLICATION FILED DEC. 21, 1903.
NO MODEL. 2 SHEETS—SHEET 2.

Witnesses:
R A Baldwin
J. B. Shu

Inventor:
Elmer A. Sperry,
by Bynon & Townsend,
Att'ys.

No. 773,235. Patented October 25, 1904.

UNITED STATES PATENT OFFICE.

ELMER A. SPERRY, OF CLEVELAND, OHIO.

LOGARITHMIC CALCULATOR.

SPECIFICATION forming part of Letters Patent No. 773,235, dated October 25, 1904.

Application filed December 21, 1903. Serial No. 185,995. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Logarithmic Calculators, of which the following is a specification.

This invention relates to that class of calculating-machines in which a circular or spiral logarithmic scale is carried by a dial arranged beneath radial pointers or hands, one or more of which are movable relatively to the dial, so that they can be set at any desired reading on the scale.

The improved calculator, which is usually a pocket device of about the size and shape of a watch, may have movable dials and hands on one or both sides, and one dial may carry a multicircular or spiral logarithmic scale, while the other dial has a single circular logarithmic scale. The movable parts are operated by suitable mechanism. In the preferred form a multiplying-gear or other mechanism serves to rotate the opposite dials at different rates of speed, so that a dial employing a scale which extends, for example, three times around the dial will rotate three times as fast as the dial having a single circular scale. The hands on the opposite faces may also be driven by intermeshing gears or other mechanism which will cause one hand to traverse the entire multicircular or spiral scale in the same time that the other hand traverses the single circular scale—that is, a hand reading on a three circular scale moves with three times the angular velocity of the hand reading on the unicircular scale. The dials and hands are usually driven by a stem or pendant corresponding to that used to wind a watch. When the calculator has two faces, the driving mechanism is such that both the dial and hand on one face move in the opposite direction to the dial and hand on the opposite face, so that when looking at either face the operation of the stem in a given direction always rotates the dial and hand in the same direction—for example, clockwise. The stem carries mechanism by which it can be employed at will to drive different elements or sets of elements. In the construction shown the stem itself is shiftable longitudinally to engage the mechanism which drives either the dials or the hands. A two-circular logarithmic scale for determining squares, cubes, and square and cube roots may be placed upon the dial within the unicircular scale.

The invention will be more readily understood by reference to the accompanying drawings, in which—

Figure 2:
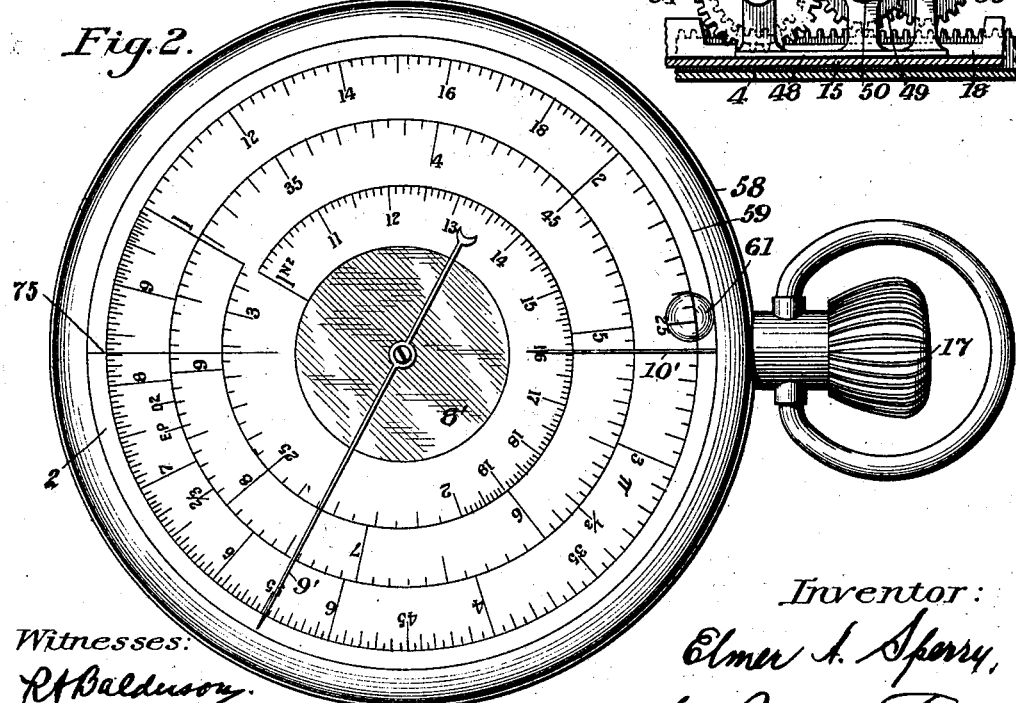
Figure 5:
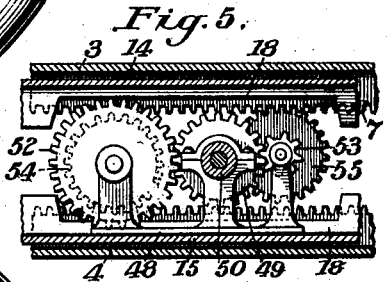
Figure 3:
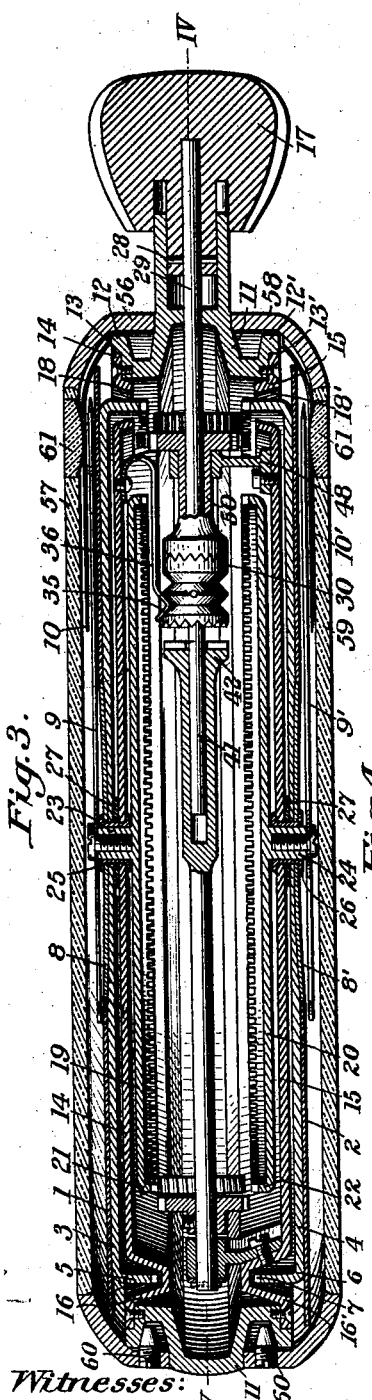
Figure 4:
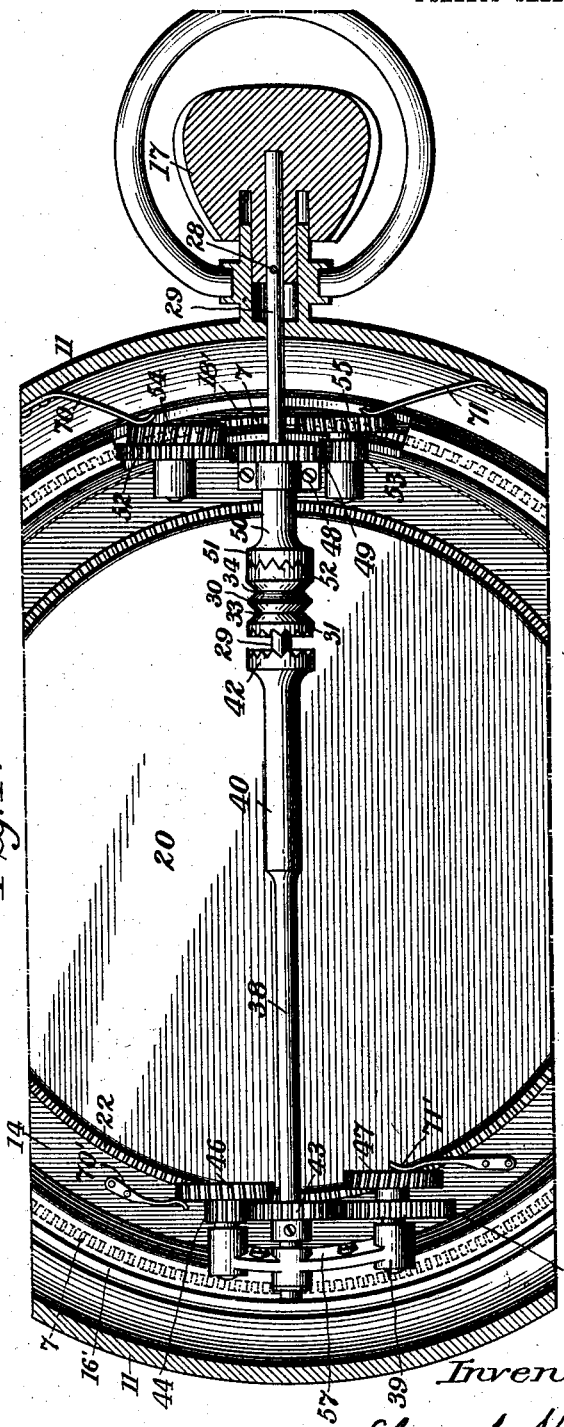

Figure 1 is a plan view of the calculator looking at the dial which carries the multicircular scale. Fig. 2 is a plan view looking at the opposite dial. Fig. 3 is a transverse central section. Fig. 4 is a section on line IV IV of Fig. 3, parts being broken away; and Fig. 5 is a detail sectional end view of a portion of the driving mechanism.

As shown, the calculator has a movable dial 1, Fig. 1, on which is a three circular logarithmic scale reading up to "10," the space between numerals "1" and "2" being subdivided into one hundred parts, the spaces of each unit from "2" to "4" being divided into twenty parts, and the spaces of each unit from "4" to "10" being divided into twenty parts. The opposite dial 2, Fig. 2, has an outer unicircular logarithmic scale reading up to "10," the space from "1" to "2" being divided into fifty parts and the spaces of each unit from "2" to "10" into twenty parts. Within the outer unicircular scale is a two circular scale for the calculation of squares and square roots. The dials 1 2, which may be of celluloid or paper, are cemented or otherwise secured on thin revoluble metal disks 3 4, respectively. The peripheral portions of disks 3 4 have flanges 5 6, respectively, extending inwardly at right angles to the plane of the disks. Teeth 7 are cut in the edge of each flange, each disk thus constituting a crown gear-wheel. The central portion of each dial supports a mirror 8 or 8', which may be secured to the dial by cement. Narrow straight hands or pointers 9 9', carried by central pivots, extend radially out over each dial, being of sufficient length to read on the entire multicircular or spiral scale. Narrow straight fixed indexes 10 10' also extend radially inward over the scales on each dial.

The dials 1 2 are provided with intermediate gearing by which they are driven in opposite directions, the ratio of the gears being such that the angular velocity of dial 1 is three times that of dial 2, so that the three circular dial 1 makes three revolutions while unicircular dial 2 revolves once.

The case of the calculator comprises a circular ring 11, having flanged edges 12 12'. The flanged edges have circular rabbets 13 13', which receive thin metal disks 14 15, secured to the ring by screws. Near the outer edge of each of these disks is an annular depression 16 16', which receives the flanges 5 6, respectively, of disks 3 4. These depressed portions are each cut away through arcs of about thirty-five degrees near the operating-stem 17, leaving slots 18 18', through which extend portions of the toothed flanges 5 6, respectively. Between the fixed disks 14 15 and parallel thereto are thin revoluble metal disks 19 20, having opposing toothed flanges 21 22, which extend at right angles to the disks. Each of these toothed disks constitutes a crown gear-wheel. The disks 19 20 have central outwardly-projecting journals 23 24, to which are secured by screws the hands 9 9', respectively. The journals 23 24 revolve within bushings 25 26, respectively, secured at their inner ends by flanges or otherwise within central holes in fixed disks 14 15 and extending outward loosely through the dials 1 2, serving as pivots upon which these dials and their supporting-disks may revolve. The outer ends of the bushings may be flanged outwardly over the dials 1 2 or the mirror, at the center thereof, to retain them in place. A spacing-washer 27 is interposed between each dial and the corresponding fixed disk 14 or 15.

Secured to the operating-stem 17 by a cross-pin 28 is a shaft 29, which extends radially inward between the crown-wheels 19 20. Secured to shaft 29 at some distance from its inner end is a clutch member 30, having teeth 31 32 at its opposite ends. Surrounding member 30 are two V-shaped grooves 33 34, either of which may receive the bent free end 35 of a spring 36, the other end of which is secured to the fixed disk 14. The shaft 29 is free to reciprocate endwise a sufficient distance to throw the teeth at either end of clutch member 35 into engagement as the stem 17 is pulled outward or pushed inward, and spring 36 serves to retain it in either of these positions. Near opposite sides of ring 11 and between the fixed disks 14 15 are two similar sets of gears. The left-hand set, (shown in Fig. 4,) acting through crown-gears 19 20, serves to operate hands 9 9'. The right-hand set, acting through crown-gears 3 4, serves to rotate the upper and lower dials 1 2. The left-hand set of gears is carried by a piece 37, which is screwed to the inner face of depressed portion 16' of lower disk 15. The driving-shaft 38 of this set is journaled at its outer end in box 39 of piece 37, while its inner end 40 is somewhat enlarged and has a central bore loosely receiving the inner end 41 of shaft 29. The end of shaft 29 thus serves as a pivot for shaft 38, while the bore of shaft 38 reciprocally acts as a journal-box and guide for shaft 29. The free end of shaft 38 carries a toothed clutch member 42 in position to engage with the teeth 31 of clutch member 30 when the stem is pushed inward. Secured near the outer end of shaft 38 is a gear-wheel 43, which engages at one side with a gear-wheel 44 and at the other side with a gear-wheel 45. Gears 44 45 have the relative diameters of one to three. The shafts which carry gears 44 45 rotate in journal-boxes which form a part of piece 37, and the shaft of gear 44 carries a gear 46, which engages the teeth 21 of crown-gear 19, while the shaft which carries gear 45 also carries a gear 47 of equal diameter to gear 46, which engages the teeth 22 of crown-gear 20. It will thus be seen that when stem 17 is pushed inwardly its rotation, acting through the clutch, shaft 38, and left-hand set of gears, will serve to rotate the hands 9 9' in opposite directions at the relative speeds of three to one. The right-hand set of gears is similar to the left-hand set, except that it is in engagement with the crown-gears 3 4, which carry the disks. The right-hand gears are carried upon a piece 48, which is screwed to the lower disk 15, and comprise a driving-gear 49, carried by a shaft 50, with clutch member 51, gears 52 53 at each side of and engaging with the central gear, and gears 54 55 rigid with gears 52 53, respectively, gear 54 engaging the teeth of crown-gear 4, which rotates dial 2, while gear 55 engages the teeth of crown-gear 3, thus rotating dial 1 in the opposite direction to and with three times the speed of dial 2.

The upper dial 1 is inclosed by a ring 56, holding a crystal 57. The lower dial 2 is inclosed by a similar ring 58, having a crystal 59. The rings 56 58 may be revolubly secured to the frame-ring 11 by set-screws 60, with beveled ends, which smoothly engage beneath the flanges 12 12' of ring 11, or the crystal may itself revolve freely within the ring. A small convex lens 61 is cemented within a circular opening in both the upper and the lower crystal in position to magnify the scale-divisions of the outer circle on each dial. A radial line 75 is scratched upon the crystal for purposes hereinafter described. The mirrors 8 8' in the center of the dials serve to prevent parallax in noting the readings of the hands upon the scales, the images of the hands being brought into coincidence with the hands themselves. It is necessary that the line of sight should always be normal to the dials and parallel to their axes to insure the correct reading. It is therefore important that the mirrors should be concentric to the dials and scales. The images of the hands will then be maintained, giving accurate readings whatever the position of the instrument. A concave silvered glass mirror reflecting a reduced image is preferable, aiding in bringing the whole face more quickly to the correct plane for accurate reading. The hand and index reading on each dial 9 10 and 9' 10', respectively, should be of dissimilar metals to prevent them from being attracted toward each other by any electrical or magnetic action and thereby interlocking, as these elements are necessarily very thin and come in close proximity.

As the hand on dial 2 travels but once around the outer scale-circle, while the hand on dial 1 travels three times around the three circular scale, the hand on dial 2 serves to indicate the particular circle on dial 1 from which the reading should be taken and may be said to serve as an index for such dial. So far as this feature is concerned the unicircular scale need not be placed on the dial 2, but might be placed on a small dial inset in dial 1 at one side of its center, similar to that commonly used in watches for reading the seconds. This unicircular scale might also be placed directly around the mirror 8 with a reading-hand concentric with but beneath hand 9, like the hour-hand of a watch. Such additional hand and scale should of course make but one revolution while hand 9 and dial 2 make three revolutions.

It will be noticed that in shifting the clutch 30 or other actuating device from one set of moving elements to the other a minute motion might be imparted to one of the sets if they are too free of movement, or they may be shifted by a jar of the instrument if normally free to move. I have therefore provided damping devices to prevent such movement and to retain the moving elements in position after being set. These consist of any friction device—as, for example, springs 70 and 71 and 70' and 71'—secured to a stationary portion of the apparatus and arranged to bear lightly upon the moving elements or a part directly connected therewith.

It is evident that the indexes 10 and 10' may be mounted upon revoluble rings like the rings 56 and 58, and may thus constitute moving elements in lieu of the faces or dials. It will thus be seen that the calculating instrument comprises three coöperating elements, two of which are movable with regard to each other and to the third, it being immaterial to the result which two are moved. If the indexes are moved, a similar mechanical coupling may exist between them, in which event they will obey the law of action of the machine, which may be briefly stated as follows: The ratio of velocities of the two corresponding moving elements must equal the ratio of the arc lengths of the scales on the two dials.

The use and operation of the device will at once be apparent from the foregoing description. Problems involving multiplication, division, ratio and proportion, interest, percentage, roots, and equations of any degree may be readily solved. In short, all "slide-rule" calculations may be carried forward on this apparatus much more readily and with greater ease and rapidity than on the straight rule, owing to the fact that the scale is continuous and practically endless and no "resetting" is required during a calculation of any magnitude. Again, the lack of portability and well-known inaccuracy, owing to expansion, of the very long slide-rules have their solution in the device of the multicircular scale, which brings the scales of a thirty-seven-inch slide-rule easily within the compass of a small timepiece, while the instrument is lighter and more portable than a watch. All the usual calculations may be readily made by use of the multicircular scale without reference to the other dial. In carrying out involved calculations or those employing large numbers, however, it may happen that the particular circle of the multicircular scale upon which an answer or factor is to be found has been lost sight of. The importance of the relation which exists between the scales on the two dials of the calculator is then apparent, the single circle giving the approximate answer and serving as an index to the particular circle of the multicircular scale upon which the exact reading will be found. With the hands and dials in the position shown in Figs. 1 and 2 the multicircular scale admits of six different readings and expresses nine different ratios. The unicircular scale on the other dial, however, at once shows that the ratio twenty-six to five hundred and forty-eight is the desired one. The single circular scale thus serves as a check on the calculation both as a whole and as to each successive step thereof.

As a simple illustration of the use of one face of the instrument assume that it is desired to multiply any number by six. The dial is rotated until the numeral "6" is brought under the stationary index 10 and is left in this position while the hand 6 is brought over the numeral "1"—that is, over the broken radial line joining the ends of the spirals. The angle thus established with reference to the index is maintained while the dial is rotated under the index and hand in either direction until the desired multiplicand is beneath either of these pointers. The product of this multiplicand and the multiplier six will then be found under the other pointer. For division the dividend and divisor are respectively brought under the two pointers—that is, the index and hand—by successively rotating the dial and the hand. While the relative angle between the pointers is maintained, the dial is revolved until the unit or broken radial line is brought under the pointer which previously stood over the divisor. The quotient is then found under the other pointer. These illustrations hold for either of the three scales on the two dials.

I have found that the radial scratch-line 75 on the crystal is of service in determining squares and roots, being especially valuable in determining cube roots from the relation of inverse squares upon the unicircular scale, the hands and index retaining the unit relation to the cube or number. Accuracy in reading the scales is secured by the use of the reflectors, avoiding parallax, and for the closest readings the lens in the crystal is swung into the field and used in connection with the reflector.

A detailed description of the use of the instrument is omitted, the manipulation being precisely identical with that of the familiar slide-rule, with the noticeable exception that the operation of "setting-back" is unnecessary, from the fact that the logarithmic scale is circular, plotted on a multiple of three hundred and sixty degrees, and therefore endless.

The form and arrangement of the various parts may evidently be modified, and any operating mechanism may be employed which will give the same result as that shown and described.

The term "multicircular" as used in the claims is intended to cover a spiral scale extending more than once around the dial.

I claim—

1. A calculating-machine, comprising a dial carrying a multicircular scale, and three coacting radial indices, said indices revoluble with reference to said dial, as set forth.

2. A calculating-machine, comprising a dial carrying a multicircular scale and a unicircular scale, and three radial indices, said indices revoluble with reference to said dial, as set forth.

3. A calculating-machine, comprising a dial carrying a multicircular scale and a unicircular scale, the unit-figures of said scales coinciding, and three radial indices, said indices revoluble with reference to said dial, as set forth.

4. A calculating-machine, comprising a plurality of groups of three elements, each group consisting of a calculating-scale, an index and a pointer, two of the elements being movable with reference to each other and to the third, and means for coupling the moving elements of different groups, as set forth.

5. A calculating-machine, comprising a plurality of groups of three elements, each group consisting of a calculating-scale, an index and a pointer, two of the elements being movable with reference to each other and to the third, the scale of one group being longer than that of the other, and means for coupling the elements of one group to those of another group so as to drive them at different relative speeds, as set forth.

6. A calculating-machine, comprising two groups of three elements, each group consisting of a circular calculating-scale, an index and a pointer, two of the elements being movable with reference to each other and to the third, the arc of one scale being longer than that of the other, and means for coupling the moving elements of one group to those of the other group so as to drive them at different speeds and with a speed ratio equal to the ratio of the arc lengths of the respective scales, as set forth.

7. A calculating-machine, comprising a plurality of groups of three elements, each group consisting of a calculating-scale, an index and a pointer, two of the elements being movable with reference to each other and to the third, means for coupling the moving elements of different groups, and means for manually actuating the moving elements, as set forth.

8. A calculating-machine, comprising a plurality of groups of three elements, each group consisting of a calculating-scale, an index and a pointer, two of the elements being movable with reference to each other and to the third, means for coupling the moving elements of different groups, and means for manually actuating each moving element, as set forth.

9. A calculating-machine, comprising a plurality of groups of three elements, each group consisting of a calculating-scale, an index and a pointer, two of the elements being movable with reference to each other and to the third, means for coupling the moving elements of different groups, and means for manually actuating each coupled group of moving elements independently, as set forth.

10. A calculating-machine, comprising a plurality of groups of three elements, each group consisting of a calculating-scale, an index and a pointer, two of the elements being movable with reference to each other and to the third, means for coupling the moving elements of different groups, and a common means for manually actuating each coupled group of moving elements, as set forth.

11. A calculating-machine, comprising a plurality of groups of three elements, each group consisting of a calculating-scale, an index and a pointer, two of the elements being movable with reference to each other and to the third, means for coupling the moving elements of different groups, and a common means for dissimultaneously actuating each coupled group of moving elements, as set forth.

12. A calculating-machine, comprising two dials, each of which carries a calculating-scale, two hands, one arranged to read on each scale, and means for simultaneously rotating said hands in opposite directions, as set forth.

13. A calculating-machine, comprising two movable dials, each of which carries a calculating-scale, the two scales being interrelated, and two hands, one arranged to read on each scale, as set forth.

14. A calculating-machine, comprising two dials, each of which carries a calculating-scale, the two scales being interrelated, two hands, one arranged to read on each scale, and a fixed index over each dial, as set forth.

15. A calculating-machine, comprising two movable dials, each of which carries a calculating-scale, the two scales being interrelated, two hands, one arranged to read on each scale, and a fixed index over each dial, as set forth.

16. A calculating-machine, comprising two opposite dials, each of which carries a calculating-scale, the two scales being interrelated, and two hands, one arranged to read on each scale, as set forth.

17. A calculating-machine, comprising two opposite, movable dials, each of which carries a calculating-scale, the two scales being interrelated, and two hands, one arranged to read on each scale, as set forth.

18. A calculating-machine, comprising two opposite dials, each of which carries a calculating-scale, the two scales being interrelated, two hands, one arranged to read on each scale, and a fixed index over each dial, as set forth.

19. A calculating-machine, comprising two opposite, movable dials, each of which carries a calculating-scale, the two scales being interrelated, two hands, one arranged to read on each scale, and a fixed index over each dial, as set forth.

20. A calculating-machine, comprising two movable dials on opposite sides, each of which carries a calculating-scale, two hands, one arranged to read on each scale, and means for simultaneously revolving the dials or hands in opposite directions, as set forth.

21. A calculating-machine, comprising a dial carrying a multicircular scale, a hand reading on the various circles of the scale, and a separate device constructed to indicate the particular circle which should be read, as set forth.

22. A calculating-machine, comprising two dials, a multicircular scale on one dial, a hand reading on the various circles of the scale, and means on the other dial for indicating the particular circle which should be read, as set forth.

23. A calculating-machine, comprising two opposite dials, a multicircular scale on one dial and a unicircular scale on the other dial, two hands, one of which reads on each scale, and means for causing one hand to indicate on the unicircular scale the particular circle of the multicircular scale which should be read, as set forth.

24. A calculating-machine, comprising two dials, a multicircular scale on one dial and a unicircular scale on the other dial, two hands, one of which reads on each scale, and means for simultaneously revolving the hands, each at an angular speed corresponding to the angular length of the scale upon which it reads, as set forth.

25. A calculating-machine, comprising two movable dials, a multicircular scale on one dial and a unicircular scale on the other dial, two hands, one of which reads on each scale, and means for simultaneously revolving the dials or hands, each at an angular speed corresponding to the angular length of the scale on that dial or upon which that hand reads, as set forth.

26. A calculating-machine, comprising a dial carrying a circular scale, a radial hand reading on the scale, and a central mirror on the dial beneath the hand, as set forth.

27. A calculating-machine, comprising a dial carrying a circular scale, a hand reading on the scale, and a minifying-mirror beneath the hand, as set forth.

28. A calculating-machine, comprising a dial carrying a scale, a hand reading on the scale, a cover-glass revolubly supported above the dial, and a lens carried by the cover-glass and focusing upon the scale, as set forth.

29. A calculating-machine, comprising a dial carrying a scale, a hand reading on the scale, a cover-glass revolubly supported above the dial, and a line on the cover-glass, as set forth.

30. A calculating-machine, comprising a dial carrying a scale, a hand reading on the scale, a cover-glass revolubly supported above the dial, and a radial line on the cover-glass, as set forth.

31. A calculating-machine, comprising a dial carrying a scale, a hand reading on the scale, a cover-glass revolubly supported above the dial, a line on the cover-glass, and a lens carried by the cover-glass and focusing upon the scale, as set forth.

32. A calculating-machine, comprising a dial carrying a logarithmic scale, a hand reading on the scale, a mirror on the dial beneath the hand, a cover-glass revolubly supported above the dial, and a lens secured in an opening in the cover-glass, as set forth.

33. A calculating-machine, comprising a dial carrying a scale, and two separate pointers reading on said scale and constructed of relatively non-attractive metals or alloys, as set forth.

34. A calculating-machine, comprising a movable dial and a movable hand, separate mechanisms for revolving either the dial or the hand, a shifting stem having a driving member, and means for engaging said member with either mechanism when the stem is shifted, as set forth.

35. A calculating-machine, comprising a movable dial and a movable hand, separate mechanisms for revolving either the dial or the hand, a shifting device having a driving member, and means for engaging said member with either of said mechanisms, as set forth.

36. A calculating-machine, comprising a movable dial and a movable hand, separate mechanisms for revolving either the dial or the hand, a driving member, means for engaging said member with either mechanism, and a device for retaining the driving member in engagement with either mechanism, as set forth.

37. A calculating-machine, comprising two dials and two hands, one hand reading on each dial, separate mechanisms for simultaneously revolving either the dials or the hands, a shifting stem having a driving member, and means for engaging said member with either mechanism when the stem is shifted, as set forth.

38. A calculating-machine, comprising two dials and two hands, one hand reading on each dial, separate mechanisms for simultaneously revolving either the dials or the hands, a driving member, means for engaging said member with either mechanism when shifted, and a device for retaining said member in engagement, as set forth.

39. A calculating-machine, comprising two dials and two hands, one hand reading on each dial, separate mechanisms for simultaneously revolving either the dials or the hands, a shifting stem having a driving member, means for engaging said member with either mechanism when the stem is shifted, and a device for retaining the driving member in engagement with either mechanism, as set forth.

40. A calculating-machine, comprising two opposite dials and two hands, one hand reading on each dial, and mechanism for relatively moving each dial and its hand, comprising a pair of duplicate parallel gears, one beneath each dial, and a train of gears between said pair of gears, one gear of said train engaging one gear of said pair and another gear of said train engaging the other gear of said pair, whereby one dial and hand may be given any desired relative speed of movement with relation to the other dial and hand, as set forth.

41. A calculating-machine, comprising two oppositely facing, movable dials and two hands, one hand reading on each dial, and gears arranged to simultaneously revolve said dials or hands, as set forth.

42. A calculating-machine, comprising two dials and two hands, one hand reading on each dial, and gear-wheels for operating said elements, the wheels of the hands being of different size from those of the faces, as set forth.

43. A calculating-machine, comprising two dials and two hands, one hand reading on each dial, and gear-wheels for operating said elements, the wheels of the hands being smaller than those of the faces, as set forth.

44. A calculating-machine, comprising two opposite, movable dials and two hands, one hand reading on each dial, and duplicate sets of gears arranged to simultaneously revolve said dials or said hands, as set forth.

45. A calculating-machine, comprising two opposite, movable dials and two hands, one hand reading on each dial, duplicate sets of gears arranged to rotate said dials or said hands in opposite directions, and a shifting driving member arranged to engage either set of gears, as set forth.

In testimony whereof I affix my signature in presence of two witnesses.

ELMER A. SPERRY.

Witnesses:
JOHN H. SIGGERS,
JULIA B. HILL.